(12) United States Patent
Thomas (10) Patent No.: US 7,647,384 B2
(45) Date of Patent: Jan. 12, 2010

(54) METHOD AND SYSTEM FOR MANAGING FRAGMENTED INFORMATION PACKETS IN A COMPUTER NETWORK

(75) Inventor: David Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 781 days.

(21) Appl. No.: 10/289,308

(22) Filed: Nov. 7, 2002

(65) Prior Publication Data

US 2004/0093425 A1    May 13, 2004

(51) Int. Cl.
*G06F 15/16*    (2006.01)
(52) U.S. Cl. .............. 709/217; 709/219; 709/228
(58) Field of Classification Search .......... 709/217, 709/219, 220–222, 228, 245, 246
See application file for complete search history.

(56) References Cited

U.S. PATENT DOCUMENTS

| | | | |
|---|---|---|---|
| 5,787,249 A | 7/1998 | Badovinatz et al. | |
| 5,964,857 A | 10/1999 | Srinivasan et al. | |
| 6,731,598 B1 * | 5/2004 | Beliveau et al. | 370/228 |
| 6,742,045 B1 * | 5/2004 | Albert et al. | 709/238 |
| 6,778,495 B1 * | 8/2004 | Blair | 370/230 |
| 6,795,866 B1 * | 9/2004 | Mankude et al. | 709/238 |
| 2002/0095512 A1 * | 7/2002 | Rana et al. | 709/232 |

OTHER PUBLICATIONS

"Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), Oct. 1998).
"Interconnections, Second Edition,", Table of Contents and Preface, by Radia Perlman (Addison-Wesley, 2000).
Oliver Spatscheck, et al., "Optimizing TCP forwarder performance," IEEE/ACM Transactions on Networking, vol. 8, No. 2, pp. 146-157, Apr. 2000.
Scalable Content-aware Request Distribution in Cluster-based Network Servers, by Mohit Aron et al., Department of Computer Science, Rice University, Houston, Texas 77005, 15 pgs., 2000.

* cited by examiner

*Primary Examiner*—Yemane Mesfin (57) ABSTRACT

A method and system are disclosed for managing fragmented information packets in a computer network. In accordance with exemplary embodiments of the present invention, an information packet is transmitted from a client to a plurality of servers via a switch, wherein the information packet is fragmented within the computer network into at least a first fragment and a second fragment. The switch forwards the first fragment to a first server of the plurality of servers using a computer network address contained in the first fragment. The switch forwards the second fragment to a second server of the plurality of servers using connection information contained in the switch. The first server transmits to the switch a fragment fabricated by the first server, wherein the fragment fabricated by the first server contains a computer network address to which the second fragment is to be sent. The switch forwards the fragment fabricated by the first server to the second server. The second server forwards the second fragment to the computer network address contained in the fragment fabricated by the first server.

39 Claims, 6 Drawing Sheets

METHOD AND SYSTEM FOR MANAGING FRAGMENTED INFORMATION PACKETS IN A COMPUTER NETWORK

CROSS REFERENCE TO RELATED APPLICATIONS

This application is related to U.S. patent application entitled "Method and System for Managing Connections in a Computer Network," Ser. No. 10/289,288, to U.S. patent application entitled "Method and System for Communicating Information Between a Switch and a Plurality of Servers in a Computer Network," Ser. No. 10/289,282, to U.S. Patent Application entitled "Method and System for Reestablishing Connection Information on a Switch Connected to a Plurality of Servers in a Computer Network," Ser. No. 10/289,311, to U.S. patent application entitled "Method and System for Managing Communication in a Computer Network Using Aliases of Computer Network Addresses," Ser. No. 10/289,379, and to U.S. patent application entitled "Method and System for Predicting Connections in a Computer Network," Ser. No. 10/289,259, each of which is filed even date herewith and each of which is hereby incorporated herein by reference in its entirety.

BACKGROUND

1. Field of the Invention

The present invention relates to computer networks. More particularly, the present invention relates to a method and system for managing fragmented information packets in a computer network.

2. Background Information

To access information on the Internet and, more particularly, the World Wide Web (WWW), users access websites that offer information and/or services. The information and/or services offered by a website are stored in and provided by computer network servers that are generally located remotely from the user. As the number of Internet users grow, computer network servers can experience an increase in the number of connections from clients to access the information and/or services available on these websites. To handle the increased connection load, the computer network servers can be scaled to meet the increased demand. For example, computer network servers can be replicated and the server replicas can be clustered to meet the increased demand. Thus, as the client connection load increases, more servers can be replicated and clustered. Because of their scalability and flexibility, computer network server clusters have become a popular method of meeting increasing communications traffic demands.

Computer network servers based on clusters of workstations or personal computers (PCs) generally include a specialized "front-end" device that is responsible for distributing incoming requests from clients to one of a number of "back-end" nodes, where the "back-end" nodes are responsible for processing the incoming requests from the clients. The front-end is responsible for handing off new connections and passing incoming data from the client to the back-end nodes. In cluster server architectures, the front-end can use weighted round-robin request distribution to direct incoming requests to the back-end nodes. With weighted round-robin distribution, incoming requests are distributed in round-robin fashion and are weighted by some measure of the load on the different back-ends.

To distribute the communications traffic among the back-end nodes, the front-end acts as a load balancer that attempts to evenly distribute the communications traffic load from the clients among the available back-end nodes. A load balancer can be, for example, a switch that connects the servers to the clients for whom the information and/or services are to be provided. To meet increasing connection loads, the load balancers can be upgraded with faster computer processors and more internal computer memory. To further increase performance and improve connection distribution among the back-end server nodes, the front-end can use, for example, the content requested, in addition to information about the load on the back-end nodes, to choose which back-end will handle a particular request.

Content-based request distribution is discussed in, for example, "Locality-Aware Request Distribution in Cluster-Based Network Servers," by Vivek S. Pai, et al. (Proceedings of the ACM Eighth International Conference on Architectural Support for Programming Languages and Operating Systems (ASPLOS-VIII), October 1998), the disclosure of which is incorporated herein by reference in its entirety. However, current load balancers (e.g., front-end switches) do not use the resources offered by the back-end server nodes, which are typically faster and more powerful than the load balancers, to assist the load balancer in determining the distribution of the connections among the back-end nodes. Rather, current load balancers determine request distribution autonomously from the back-end nodes.

One example of a conventional load balancer that can act as a front-end for a computer network cluster is a Layer Four (L4) switch. A L4 switch takes into account Transport Layer information (i.e., Layer Four of the International Organization for Standardization (ISO) Networking model, or ISO model). A discussion of computer network protocols and layers of the ISO model is discussed, for example, in "Interconnections, Second Edition," by Radia Perlman (Addison-Wesley, 2000), the disclosure of which is incorporated herein by reference in its entirety. L4 switches manipulate both the network and transport protocol headers of the communications traffic passing through them to forward the communications traffic to the back-end nodes. A L4 switch can operate with, for example, the Internet Protocol (IP) for the network layer and the Transport Control Protocol (TCP) for the transport layer.

The IP network layer permits the fragmentation of a transport layer protocol data unit (PDU) into multiple packets. While the first packet contains a full L4 header, the remaining packets of the PDU do not. Load balancers store IP fragments when performing L4 switching. The load balancer buffers and manages fragments in its memory until the fragment with the full L4 header is received. The handling of packet fragments in such a manner introduces increased complexity into the design and operation of L4 switches.

SUMMARY OF THE INVENTION

The present invention is generally directed to a method and system for managing fragmented information packets in a computer network, comprising transmitting, from a client to a plurality of servers via a switch, an information packet, wherein the information packet is fragmented within the computer network into at least a first fragment containing a computer network address of a first of the plurality of servers, and into a separately transmitted second fragment; and assembling (e.g., reassembling) the information packet in the first server by transmitting the second fragment from a second server to the first server.

Alternate embodiments are directed to a method and system for managing fragmented information packets in a computer network, comprising transmitting, from a client to a plurality of servers via a switch, an information packet, wherein the information packet is fragmented within the computer network into at least a first fragment containing a computer network address of a first of the plurality of servers, and into a separately transmitted second fragment; and assembling (e.g., reassembling) the information packet in a third server by transmitting the second fragment from a second server to the third server.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
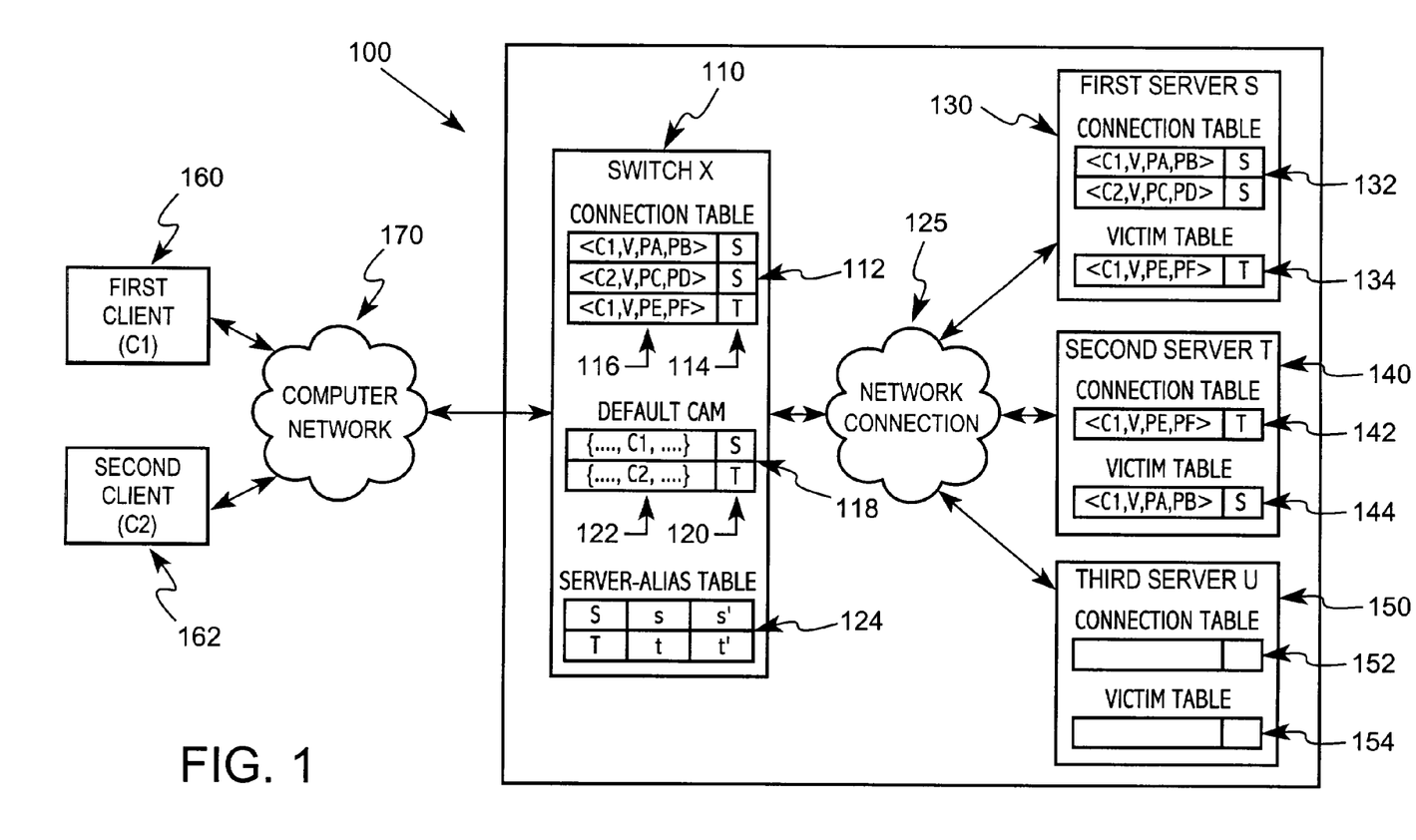
FIG. 1 is a block diagram illustrating a system for managing fragmented information packets in a computer network in accordance with an exemplary embodiment of the present invention.

FIG. 1 is a block diagram of a system 100 for managing fragmented information packets in a computer network in accordance with an exemplary embodiment of the present invention. System 100 includes a switch 110 for receiving and forwarding an information packet that has been fragmented within computer network 170 into at least a first fragment and into a separately transmitted second fragment. For purposes of the following discussion, and by way of example, the first fragment of the information packet identifies the intended recipient (e.g., contains a complete computer network address of the first server such as a full L4 header) and the remaining fragments include information which identifies them as part of the information packet (e.g., fragment identifier).

The present invention will be described in the context of three exemplary embodiments to handle the forwarding of separately received fragments of an information packet to the intended recipient, where the fragments can be received and queued at the server back-end in any order. Each of these embodiments will also be described in the context of an alternate embodiment that provides a connection splicing feature.

Generally speaking, each of the three exemplary embodiments assemble (e.g., reassemble) an information packet in a first server of a plurality of servers by transmitting at least a second fragment from a second server to the first server. However, those skilled in the art will appreciate that the invention is not limited to these embodiments and numerous variations and permutations will be apparent.

In a first embodiment, the assembling includes transmitting the first fragment (which identifies the computer network address of the first server) and the second fragment (which does not identify a recipient) via the switch to the second server. To achieve this, the switch uses connection information contained in the switch to select the second server as the recipient, and indicates the first server when transmitting the first fragment to the second server. The switch similarly transmits the second fragment to the second server. The first fragment and the second fragment are then forwarded from the second server to the first server.

In a second embodiment, the assembling includes forwarding by the switch, the first fragment to the first server using the computer network address contained in the first fragment. The second fragment is forwarded to the second server using connection information contained in the switch. A fragment fabricated by the first server (e.g., a "dummy fragment") is transmitted to the switch, and contains the computer network address (e.g., in the Ethernet source address) to which the second fragment is to be sent. The switch rewrites the header of the fabricated fragment, directing it to the second server. The fragment fabricated by the first server is then forwarded by the switch to the second server. The second server then forwards the second fragment to the computer network address contained in the fabricated fragment.

In a third embodiment, the assembling includes using a predetermined group membership function of the switch to distribute the second fragment, wherein the predetermined group membership function is known to each of the plurality of servers. In contrast to the second embodiment, such an embodiment optionally permits a second server to forward the second fragment to the first server without using the switch, or a fragment fabricated by the first server. The first server can use the group membership function to notify the second server that subsequent fragments of the information packet should be forwarded to the first server.

A connection splicing feature can be used as to vary any of these three embodiments. For example, with this feature, fragmented information packets can be assembled in a third server using fragments forwarded from the first and/or second servers.

The initial three exemplary embodiments, and variations thereof, will be described with respect to FIG. 1. In FIG. 1, computer network 170 can be any type of computer network in which information in the form of packets can be transmitted, received, otherwise communicated within and throughout the computer network. For example, computer network 170 can be a local area network (LAN), wide area network (WAN), any type of intranet or Internet, or any other type of computer network or computer system capable of transporting packets of information.

As used herein, an "information packet" can be any format of aggregated bits that forms a protocol data unit (PDU) that is capable of carrying any type of information over a packet-switching network. The information packet can carry, for example, data, commands, or any other type of information. According to exemplary embodiments, an information packet can be a transmission control protocol (TCP) PDU, a user datagram protocol (UDP) PDU, or any other form of packet that is capable of carrying any type of information over a packet-switching network.

Switch 110 can receive an information packet through computer network 170 from a client, such as, for example, first client 160, second client 162, or any number of clients. As used herein, a "client" can be any type of computer system, such as, for example, a personal computer (PC), a workstation, a minicomputer, a supercomputer, or any other form of computer system capable of transmitting and receiving information packets over a computer network. According to exemplary embodiments, the client can request, for example, information or services from one or more of the plurality of servers over the computer network. Switch 110 can be connected to the clients remotely. If connected remotely, computer network 170 can be any form of WAN or for example, the Internet. However, switch 110 can be connected to the clients locally using, for example, a LAN or a direct connection to switch 110.

According to exemplary embodiments of the present invention, during transmission of an information packet from first client 160 to switch 110 through computer network 170, the Internet Protocol (IP) network layer can permit the fragmentation of transport layer PDUs into multiple pieces or fragments. Thus, an information packet can be broken up or otherwise fragmented into smaller packets, referred to herein as "fragments." The first fragment can contain a computer network address of a first of plural servers. The first fragment can include a full Layer 4 (L4) header (i.e., Layer 4 of the International Organization for Standardization (ISO) model), while the remaining (second and subsequent) fragments do not contain a full L4 header. Thus, the first fragment can contain a L4 TCP header, but the L4 TCP header is absent from the second fragment and all other non-first fragments that have been created from the original information packet. However, the second fragment can be transmitted separately from the first fragment during forwarding of an information packet that includes the first and second fragment.

System 100 includes a first server 130 of a plurality of servers. According to exemplary embodiments, each of the plurality of servers can be any type of computer system, such as, for example, a personal computer (PC), a workstation, a minicomputer, a supercomputer, or any other form of computer system capable of transmitting and receiving information packets over a computer network. According to exemplary embodiments, each server of the plurality of servers can provide, for example, information or services to one or more clients over a computer network in response to requests from the one or more clients for such information or services. System 100 can include any number of servers.

The plurality of servers can be connected to switch 110 through a network 125. Network 125 can be any type of computer network where the Layer 2 header is preserved (for example, a LAN, WAN, or any form of intranet where the Layer 2 header is preserved). The plurality of servers can be connected to switch 100 through network 125 using any form of computer network connection, such as, for example, an Ethernet connection. According to an alternate embodiment, the plurality of servers can be connected directly to switch 110 using any form of connection (e.g., electrical, optical, wireless, wired or the like) capable of transmitting and receiving information between the plurality of servers and switch 110. In such an alternate embodiment, the network connection of network 125 is a direct connection. According to exemplary embodiments, although the plurality of servers can communicate with the clients through switch 110, the plurality of servers can send additional information packets to clients through computer network 170 using alternate mechanisms. For example, the plurality of servers can also include additional network interfaces that connect each of the servers to computer network 170 so that computer network communication can take place without the use of switch 110.

Switch 110 is a Layer 4 (L4) switch. A L4 switch takes into account Transport Layer Information (i.e., Layer 4 of the ISO model). For example, the L4 switch can examine port numbers of the TCP protocol, although switch 110 can use other transport and network protocols, such as, for example, UDP.

A switch can operate at the Data Link Layer (i.e., Layer 2 of the ISO model). An exemplary Data Link Layer is Ethernet. An Ethernet switch can forward packets without modification.

In contrast to a switch, a router can operate at the Network Link Layer (i.e., Layer 3 of the ISO model). An example of a Network Link Protocol is the Internet Protocol (IP). A network router can interconnect different link layers and generate a new link layer header for each packet passing through the network router. A network router can also manipulate the IP header of packets passing through the network router.

According to exemplary embodiments, switch 110 can be a hybrid of the Ethernet switch and the network router. For example, switch 110 can rewrite or otherwise manipulate the link layer header of information packets, but does not modify information packets in the manner performed by routers. According to exemplary embodiments, switch 110 can use the IP protocol for the network layer and the TCP protocol for the transport layer, although different protocols can be used for the various layers.

Switch 110 can store, maintain, and manage several tables that can be used to forward information packets between the clients and the plurality of servers. Each table is a collection of information that can be stored in any type of computer memory in switch 110, such as, for example, Random Access Memory (RAM), a hard disk, or any other type of electronic storage medium. For each table, a key/value pair is used to access information—the key is used to index and locate information in the table and the value is associated with the key.

A table that can be maintained by switch 110 is a connection table 112. Connection table 112 maps connections switch 110 has been informed about to the server that is handling the connection, wherein information packets are communicated between a client and a server of the plurality of servers over the connection. Value field 114 of connection table 112 can hold a value or values representing the name, address or any other designation of a server. Key field 116 can include connection tuples associated with the servers in field 114, and field 116 can be used to index or otherwise locate the value in field 114 that corresponds to the particular key field 116. According to an exemplary embodiment, connection table 112 can be a hash table maintained in RAM of switch 110. Of course, the field 114 can be alternately used as an index field to access the values of field 116.

According to exemplary embodiments, another table that can be maintained by switch 110 is a default content addressable memory (CAM) 118. Default CAM 118 can provide, for example, an initial assignment of connections to servers and it can provide the mapping of non-first fragments to servers. According to exemplary embodiments, default CAM 118 can be a ternary CAM.

A role of the default CAM, according to exemplary embodiments of the present invention, is to implement a dispersal algorithm for handling the absence of connection information in the connection table. The default CAM can be accessed during an initial assignment of connections as mentioned, but can also be accessed when connection information has been lost, deleted, or rendered inaccessible from the connection table for any reason. The dispersal algorithm can be established at the switch by the system in advance, or can be established at the switch by having at least one of the plural servers notify the switch of the dispersal algorithm to be used for allocating computer network address space of the plural servers. In this latter case, a first server can run the dispersal algorithm on all of its connections, and inform all of its potential victim servers of the connections each such victim server will be handling for the first server. Each of the remaining servers can do the same.

An exemplary dispersal algorithm can be a predetermined pattern matching algorithm implemented using a ternary CAM (or other desired mechanism). In a scenario where information (e.g., first information) is directed to the switch from a client, but there is no connection information in the connection table of the switch, the default CAM can be accessed to identify an appropriate so-called victim server to which the first information packet should be forwarded. The servers then handle the forwarding of the first information packet from the victim server to the appropriate destination server. A ternary CAM is suitable for use as the default CAM because it is a content addressable memory with "don't care" matching to provide wildcards on various fields of value field 120 as accessed by key field 122. Thus, the ternary CAM can provide pattern matching. If a value matches several patterns in default CAM 118, a priority encoder can be used to determine the result. Priority encoders are described, for example, in U.S. Pat. No. 5,964,857, the entire disclosure of which is hereby incorporated herein.

Each information packet can include a connection tuple having a designated number of bits used to represent at least five fields for specifying a source Internet Protocol (IP) address, a destination IP address, a source port, a destination port and a protocol. These bits can be considered to designate an address space that can be allocated among the plural servers. In the absence of connection information in the connection table, the default CAM can be accessed to determine a match on a selected number of these bits (e.g., a match on the four least significant bits of the source IP address whereby a first portion of the address space from "0000" to "0010" can be allocated to a first of four servers). The information packet is thus forwarded to the server preassigned to handle any information packets within the first portion of the address space. The servers can have a preestablished mechanism (e.g., victim tables) for forwarding information packets from a particular victim server to an appropriate destination server.

As an alternate to using predetermined pattern matching, the dispersal algorithm can, for example, be a hash function. That is, any or all of the bits received in an information packet can be used to calculate an entry to a hash table, which in turn, designates an appropriate victim server.

In addition to the connection table and the default CAM, another table that can be maintained by switch 110 is a server-alias table 124. According to exemplary embodiments, server-alias table 124 can perform several functions. For example, server-alias table 124 can contain a list of the plurality of servers. The name, address or other designation of each of the servers can be used as a value accessed by a key used to index or otherwise locate information in the server-alias table (e.g., the Ethernet address corresponding to the IP address of a server). Server-alias table 124 can also contain a list of alias addresses for servers that are used by the switch.

According to exemplary embodiments, each of the plurality of servers can also store, maintain, and manage several tables for connection management. Each table is a collection of information that can be stored in any type of computer memory in each of the plurality of servers, such as, for example, Random Access Memory (RAM), a hard disk, or any other type of electronic storage medium. For each table, a key/value pair can be used to access information—the key is used to index and locate information in the table and the value is associated with the key.

Each of the plurality of servers can have a connection table, such as, for example, connection table 132 of first server 130. The server connection table can contain a list of the connections for which the server is the terminating server. In other words, the server connection table lists those connections that the server is handling. Each of the plurality of servers also includes a victim table, such as, for example, victim table 134 of first server 130. The victim table can contain the connection and fragment information that the server handles on behalf of another server. In other words, the victim table lists the non-terminating connections on which the server will receive packets, such as fragmented packets. For each of the fragmented packets received on the non-terminating connection, the victim table lists the terminating server to which the non-terminating server can relay the fragmented packets. The victim tables can be populated as a function of the selected dispersal algorithm.

For purposes of illustration, as shown in FIG. 1, IP addresses are denoted by uppercase letters (e.g., C1, C2, S, T, U). Ethernet addresses (i.e., Medium Access Control (MAC) addresses) are denoted by lowercase letters (e.g., c1, c2, s, t, u). As discussed below, switch 110 can masquerade as a server to pass server address information from one server to another. When switch 110 masquerades as a server, it can use alias addresses denoted by lowercase letters with apostrophes (e.g., s', where s' is an alias for s).

According to exemplary embodiments, switch 110 can connect a plurality of servers to clients over computer network 170. Thus, the switch can act as a "front-end" to the plurality of servers, while the plurality of servers can act as the "back-end." According to exemplary embodiments, IP aliasing can be used when communicating information packets between the plurality of servers and the clients through switch 110. With IP aliasing, switch 110 and the plurality of servers are addressed to clients using a single, collective IP address (e.g., an address "V"). In other words, switch 110 and the plurality of servers appear as a single computer system with a single IP address (e.g., address "V"), such that "knowledge" of the separate components of system 100 is hidden from the clients.

Thus, when a client addresses switch 100 and/or any of the plurality of servers, the client simply sends an information packet to a single IP address (e.g., address "V"). Switch 110 will then direct the packet to the server handling the connection to the client. When sending information packets to clients using IP aliasing, each of the plurality of servers can write the IP source address as the single, collective IP address (e.g., address "V"), and not the server's unique IP address. However, according to exemplary embodiments, at the Ethernet layer, each of the plurality of servers can use their individual Ethernet addresses (i.e., MAC address) as their source Ethernet address.

According to exemplary embodiments, amongst the Layer 2 (L2) (i.e., Ethernet) packet layer, Layer 3 (L3) (i.e., IP) packet layer, and the L4 (e.g., TCP) packet layer, there are six fields which can used to represent packets in system 100: an Ethernet destination address (from the L2 packet layer); an Ethernet source address (from the L2 packet layer); a source IP address (from the L3 packet layer); a destination IP address (from the L3 packet layer); a source port (from the L4 packet layer); and a destination port (from the L4 packet layer).

Those skilled in the art will appreciate that an additional protocol field can be included (e.g., to identify TCP), and need not be discussed further. For purposes of illustration and not limitation, a packet from first client 160 (i.e., "C1") to system 100 (i.e., "V") can have the following fields, where "s" represents the Ethernet address of first server 130, "x" represents the Ethernet address of switch 110, and "PA" and "PB" are the source and destination TCP ports, respectively: [x, c1, C1, V, PA, PB]. For example, if first server 130 is handling the connection, the switch 110 can rewrite the packet as: [s, x, C1, V, PA, PB]. When the server sends a reply, the server uses the IP alias "V" instead of its own IP address. Consequently, the reply packet is: [x, s, V, C1, PB, PA].

As noted, the reply packet swaps the source and destination IP addresses. From this swapping, a canonical addressing format can be used to represent packets as follows: <client IP address, server IP address, client port, server port>. In accordance with exemplary embodiments of the present invention, the canonical addressing format is used to represent packets and connections in system 100 of FIG. 1. According to exemplary embodiments, if the packet came from a client, then the fields are in canonical form. If the packet came from a server, then the fields can be swapped to generate the canonical form. Switch 110 can use server-alias table 124 to determine if the packet was sent by a server, and, therefore, the fields should be rearranged. Alternatively, if "V" is the source IP address, then the fields should be swapped. By using a canonical form in accordance with exemplary embodiments, connection table 112 can use a single entry to track a connection for each packet direction. Alternatively, two indices can be used—one for each packet direction.

In accordance with the first embodiment, the switch can be configured to forward the first fragment to a second server, with the first fragment marked to indicate the terminating server (e.g., marked with alias address of terminating server). In this case, the default CAM can be used to choose the server to which the first fragment is to be sent in a manner similar to the handling of non-first fragments. In the first embodiment, the first fragment would then be transmitted from the second server to the first server. In this embodiment, the first and non-first fragments are forwarded by the switch to the second server. The first and non-first fragments are subsequently forwarded from the second server to the first server once the second server knows the alias contained in the first fragment forwarded by the switch.

According to the second exemplary embodiment, switch 110 can receive a fragment from, for example, first client 160. When switch 110 receives a first fragment, i.e., a fragment that contains a full L4 header, switch 110 can use the computer network address contained in the first fragment (e.g., client IP address, server IP address, client port number, and server port number) to locate an entry in connection table 112 to determine the server to which to forward the first fragment. When switch 110 receives a second or other non-first fragment, i.e., a fragment that does not contain a full L4 header, switch 110 does not use connection table 112, but rather searches default CAM 118 to determine a victim server to which the non-first fragment is sent. In each of the embodiments described herein, fragments can be re-ordered during transit from a client. The first, second, and other non-first fragments can be received and processed in any order, as in order packet arrival is not necessary. The first server can send a dummy fragment to the second server to indicate the identity of the first server to the second server.

The third embodiment can avoid use of a dummy fragment if a predetermined group membership function exists on the back-end. A group membership function is a preestablished relationship among a server and its designated victim server (s) whereby the victim server(s) can, for example, access a victim table(s) to determine where to send the fragments.

According to the second and third exemplary embodiments, the fragmented information packet can be assembled in the first server by transmitting the first fragment to the first server, and by transmitting at least the second fragment from the second server to the first server. If first server 130 is handling the connection to client 160, switch 110 can forward the first fragment to first server 130 through network 125. The switch 110 uses default CAM 118 to choose a victim server to receive the second and all non-first fragments of the information packet.

Thus, in the first, second and third embodiments, the switch can determine which server is to receive first and/or non-first fragments. To determine the server to receive the first and/or non-first fragments, exemplary embodiments use at least one of the source IP address and a fragment identifier to allocate the second fragment to a server, wherein the source IP address and the fragment identifier are contained in the first and second fragment. For example, switch 110 can use the source IP address and the 16-bit IP fragment identification, both contained in the L3 IP header of the fragments, to select a single server to receive the fragments.

The server that receives the fragments for a designated recipient server of a particular connection has been referred to herein as a "victim server." The source IP address and/or fragment identifier of the first and/or non-first fragments can be used by switch 110 to search default CAM 118 to locate the victim server that can handle these fragments. For purposes of illustration and not limitation, second server 140 of the plurality of servers can be the victim server for the fragments of the information packet described herein, although any server can be chosen by switch 110 using default CAM 118.

The victim server chosen can be based on the search of default CAM 118, and so the same victim server will not receive all fragments from all connections. Rather, the fragments for different connections will be distributed across the back-end by switch 110, so that each server of the plurality of servers can act as a victim server. By not using a single server for all fragments from all connections, exemplary embodiments can avoid a systematic computer attack which can constitute a denial of service to connections that use fragments. Thus, by distributing the load of handling fragments amongst the backend servers, a malicious client can have more difficulty in orchestrating a denial of service attack on system 100.

In the FIG. 1 embodiment, server 140 is designated a second server of the plurality of servers for receiving the first and/or second fragment that has been forwarded from switch 110 using connection information contained in switch 110. According to exemplary embodiments, the connection information can include connection table 112, default CAM 118 and server-alias table 124 in switch 110. For example, switch 110 can use default CAM 118 to determine that server 140 is the victim server to receive the fragments. Once chosen, second server 140 receives the first and/or non-first fragments of the information packet for the connection. By acting as the victim server, second server 140 temporarily stores the fragments.

According to the first exemplary embodiment, when the second server (that is, the victim server) receives the first fragment via the switch, the second server can determine that the first server is the correct recipient. That is, when switch 110 receives the first fragment, the switch can use the connection table to identify the first server 130 as the correct recipient. The switch can use this information to locate the alias address of the first server for inclusion in the information packet when it is forwarded to the second server 140 (assuming server 140 is to be the selected victim server). This can be achieved by having the switch 110 masquerade as the first server by using the first server's alias address when transmitting the first fragment to the second server.

For example, the switch 110 can use the Ethernet source address in the source address field representing the alias of the first server 130 (e.g., S'), with the destination address T of second server 140 in the destination field, when the switch 140 sends the first fragment to the second server. The second server will thus recognize first server 130 as the correct recipient, and upon receiving any or all subsequent fragments associated with the information packet, can forward them to first server.

In the second and third embodiments, first server 130 receives the first fragment and second server 140 receives the second and all non-first fragments. To transfer the second and non-first fragments to first server 130, the identity of the terminating server (i.e., first server 130, the server handling the connection) can be communicated to second server 140 from the first server, or can be established in advance using a predetermined group membership function.

For example, in the second embodiment, where the first fragment is sent by the switch 110 to the first server 130, the first server 130 can transmit to switch 110 a fragment fabricated by first server 130 (e.g., a dummy fragment). In this embodiment, first server 130 does not know the identity of the victim server that is handling the non-first fragments, and second server 140 does not know the identity of the terminating server to which the non-first fragments are to be forwarded. Thus, first server 130 communicates its identity to the victim server in a fragment fabricated by first server 130 and forwards this fabricated fragment to switch 110.

The fragment fabricated by first server 130 contains a computer network address to which the second fragment (and any other non-first fragments) is to be sent by second server 140. The fragment fabricated by first server 130 contains the same IP address and fragment identifier contained in the second and non-first fragments. Thus, the fragment fabricated by first server 130 has the same format as the second fragment. Since switch 110 knows the victim server that is handling the non-first fragments for first server 130, switch 110 can forward the fabricated fragment to second server 140 by searching default CAM 118, as switch 110 does with other non-first fragments. According to exemplary embodiments, the computer network address to which the second fragment is to be sent by second server 140 is the computer network address (e.g., the Ethernet or MAC destination address) of first server 130.

To send the fabricated fragment to switch 110, first server 130 can put the Ethernet (MAC) address of switch 110 in the Ethernet (MAC) destination address field of the fabricated fragment. The Ethernet (MAC) source address of the fabricated fragment is that of first server 130, which is the identity of the server that is to be communicated to second server 140. According to an exemplary embodiment, second server 140 receives the fragment fabricated by first server 130 that has been forwarded by switch 110 to second server 140 from the first server.

Before the fragment fabricated by the first server is forwarded to second server 140 by switch 110, switch 110 replaces the computer network source address (i.e., Ethernet (MAC) source address) of first server 130 in the fabricated fragment with an alias of a computer network address of first server 130. That is, switch 110 can replace the Ethernet (MAC) source address of the fabricated packet with an alias of the computer network address of first server 130, rather than the actual Ethernet (MAC) source address of first server 130. Second server 140 can map the alias address of first server 130 to first server 130 and update victim table 144 appropriately. By including the alias of the first server in the dummy fragment, the second server recognizes the fragment as a dummy fragment to be used in updating the victim table. An aliasing mechanism is also described in co-pending U.S. patent application Ser. No. 10/289,311, entitled "Method and System for Managing Communication in a Computer Network Using Aliases of Computer Network Addresses", filed even date herewith, the disclosure of which is hereby incorporated herein by reference in its entirety.

For purposes of illustration and not limitation, an example of pseudo-code that can be used by switch 110 to forward fragments in system 100 is shown below, where "DA" is destination address and "SA" is source address:

```
if (fragment)
    if (first fragment)
        Process full header and send (to first server 130);
    else {
        //
        // Search default CAM 118 to determine where to send
        // non-first fragment.
        //
        // Result from a lookup in default CAM 118.
        //
        MAC DA = MAC address of second server 140;
        if (source is client) {
            MAC SA = MAC address of switch 110;
        }
        else {
            MAC SA = alias address of first server 130;
        }
    }
```

Once second server 140 receives the fragment fabricated by first server 130, second server 140 can use the Ethernet (MAC) source address of the fabricated fragment to create an entry in victim table 144 of second server 140 (i.e., the victim server). The entry in victim table 144 of second server 140 informs second server 140 that non-first fragments with the particular source IP address and fragment identifier of the fabricated fragment are to be forwarded to the address of the server contained in the fabricated fragment (e.g., first server 130). Thus, once created, second server 140 can forward the second fragment (and all non-first fragments) to the computer network address contained in the fragment fabricated by first server 130 using victim table 144 of second server 140. Once first server 130 receives the any non-first fragments, first server 130 can assemble the original information packet from the fragments.

According to the third embodiment, instead of forwarding the fragment fabricated by first server 130 through switch 110 to inform second server 140 of the address to which to forward the second and non-first fragments, a predetermined group membership function can be used to distribute the fabricated fragment. The predetermined group membership function can be known to switch 110 and each of the plurality of servers. The predetermined group membership function can be any function that can be used by switch 110 and the plurality of servers to determine the members that are active and participating in system 100. Group membership functions are described, for example, in U.S. Pat. No. 5,787,249, the entire disclosure of which is hereby incorporated herein.

According to this third embodiment, the predetermined group membership function can be stateless, and can use at least one of a source IP address, a destination IP address, and a fragment identifier to determine the distribution of the second fragment and other non-first fragments. Since the predetermined group membership function is known to all servers, first server 130 can use the predetermined group membership function to determine to which of the plurality of servers to transmit the fragment fabricated by first server 130. Consequently, first server 130 can forward the fabricated fragment directly to second server 140. Upon receipt of the fabricated fragment, second server 140 can forward the second and non-first fragments to first server 130.

A connection splicing variant can be applied to any of the three embodiments described herein. As opposed to the single connection examples provided above, two TCP connections are spliced together into a single forwarding path through the system. The resulting spliced connection replaces the processing steps of two separate TCP connections with a single, reduced processing step. Connection splicing is described, for example, in Oliver Spatscheck, et al., "Optimizing TCP forwarder performance," IEEE/ACM Transactions on Networking, Vol. 8, No. 2, pp. 146-157, April 2000, the entire disclosure of which is hereby incorporated herein.

Figure 2:
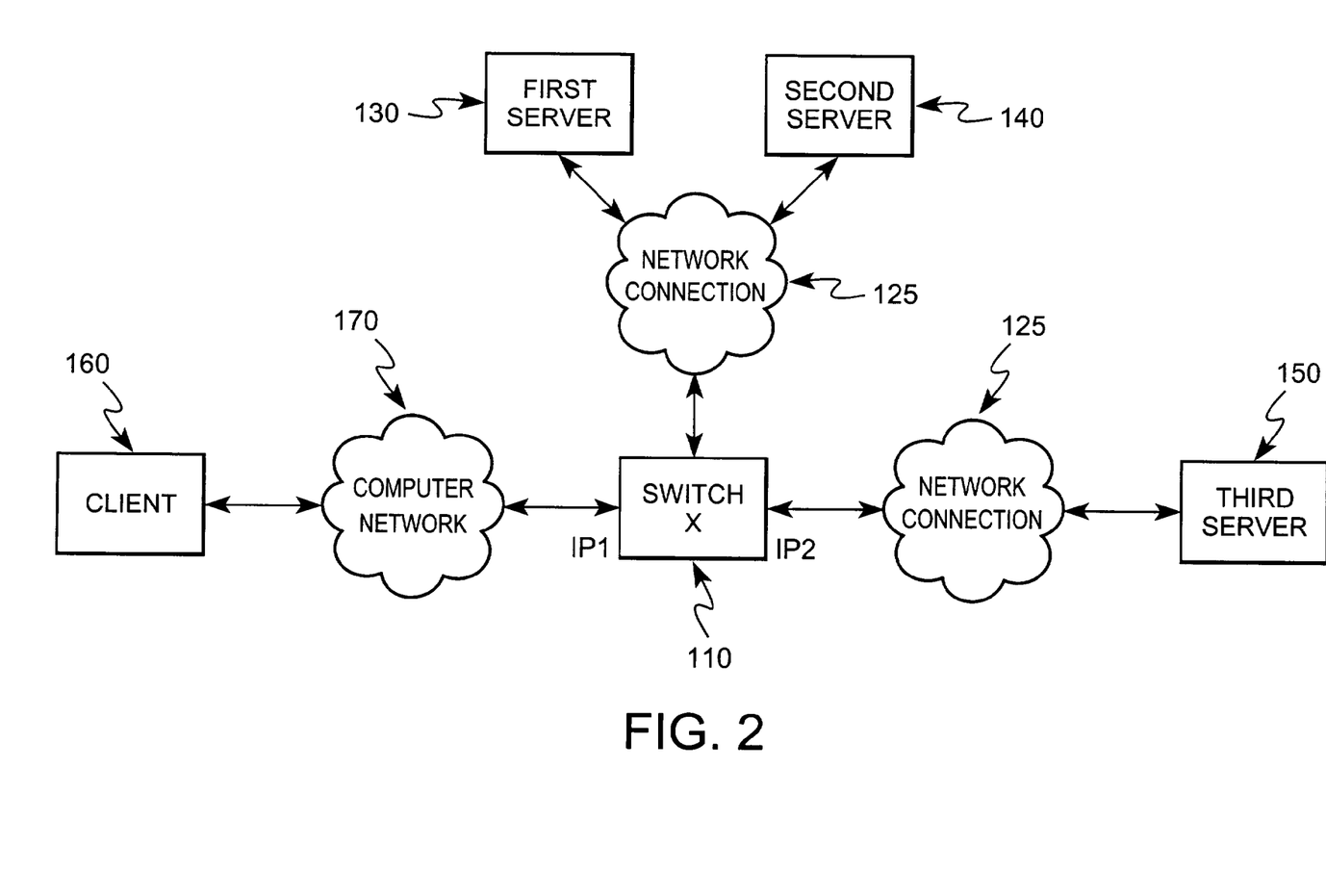
FIG. 2 is a block diagram illustrating a system for managing fragmented information packets in a computer network in accordance with an alternate exemplary embodiment of the present invention.

FIG. 2 is a block diagram illustrating a system for managing fragmented information packets in a computer network in accordance with alternate exemplary embodiments that use connection splicing. In this embodiment, an information packet is transmitted from a client to a plurality of servers via a switch, wherein the information packet is fragmented within the computer network into at least a first fragment containing a computer network address of a first of the plurality of servers, and into a separately transmitted second fragment. The information packet is assembled in a third server by transmitting the second fragment from a second server to the third server.

As with FIG. 1, the system of FIG. 2 includes a switch 100 for receiving and forwarding an information packet that has been fragmented within computer network 170 into at least a first fragment and a second fragment. The system also includes at least one client 160.

For the connection splicing performed by the system of FIG. 2, wherein the intended destination is a third server 150, the headers of the first fragments received from the client C1 can be modified using the following transformation: <C1, IP1, c1port, ip1port> ⇒<IP2, U, ip2port, uport>. In this transformation, "C1" is the source IP address of client 160, "IP1" is the destination IP address of the first TCP connection between client 160 and switch 110, "c1port" is the source TCP port number of client 160, "ip1port" is the destination TCP port number of switch 110, "IP2" is the source IP address of the second TCP connection between switch 110 and third server 150, "U" is the destination IP address of third server 150, "ip2port" is the source TCP port number of switch 110, and "uport" is the destination TCP port number of third server 150.

In performing the transformation, the L3 headers of the fragments are rewritten. Thus, the source and destination IP addresses and the TCP port numbers of the fragmented packets can be rewritten. To perform this, the first fragment can be used to determine the above transformation (as it contains the full L4 header), and then the transformation can be applied to each non-first fragment that matches <C1, IP1, identifier>. In the embodiment illustrated in FIG. 2, the fragments can be rewritten by a server, rather than switch 110.

For connection splicing, one of the plurality of servers can make a request to switch 110 to splice two connections. The server making such a request can be referred to as the "initiator." When the first fragment, (i.e., the fragment which includes the computer network address of server 130, and a full L4 header), arrives, switch 110 forwards the first fragment to the initiator.

To apply a connection splicing feature to the first exemplary embodiment, the first server 130 (whose computer network address is included in the first fragment) would be the initiator. Thus, first server 130 can make a request that the switch 110 splice connections from the client 160 to the third server 150. When the first fragment is received at the switch, it is rewritten by the switch to contain the alias of the first server. Switch 110 forwards the first fragment to the second server 140. The second fragment, and all subsequent fragments are directed to the second server.

The second server can determine the identity of first server 130 as the initiator using the alias designation of the first fragment. That is, because switch 110 marked the first fragment with the alias of the initiator, the second server 140 knows the initiator's identity. Since second server 140 will not be reassembling the fragments (as the fragments are intended for third server 150), second server 140 can request the connection transformation tuple from the initiator <C1, IP1, iport, ip1port> ⇒<IP2, U, IP2port, uport> so that the second server can rewrite non-first fragments, thus, mapping them to the third server. That is, non-first fragments (which do not contain a L4 header), are forwarded to the second server designated by the default CAM 118, and the second server forwards them to the third server 150.

In applying connection splicing to the second embodiment, a dummy fragment created by the first server can be used to inform the second server of the connection transformation. A first fragment which contains the L4 header can be used to determine the computer network address of the first server 130 at the switch, and permit the first fragment to be forwarded by the switch to the first server. The second fragment of the information packet is forwarded by the switch to the second server 140. In this embodiment, the first server again acts as the initiator.

A fragment fabricated by first server 130 can contain, in the body (e.g., payload) of the fabricated fragment, the computer network address (e.g., the IP address) of the third server to which the second fragment is to be sent by second server 140. According to this alternate embodiment, the fabricated fragment is forwarded by the switch to the second server. Because the fabricated fragment includes the alias of the first server as an identifier in the source address, the second server recognizes the fabricated fragment as a dummy fragment, as opposed to a fragment that was part of the original information packet. Therefore, the second server 140 knows to use the address contained in the body of the fabricated fragment to create an entry in its victim table 144. The dummy fragment created by the first server can contain an exemplary fragment mapping for first client C1; switch IP addresses IP1, IP2; and third server U as follows: <C1, IP1, identifier > ⇒<IP2, U>.

Second server 140 can then rewrite the second fragment with the IP address of the third server (U), and forward the second fragment (and any other non-first fragments) to that address (e.g., the IP address of the third server). Note that the alias of the first server is used to identify the fabricate fragment as a dummy fragment, but the alias is not used in rewriting the header.

To choose the server for processing the non-first fragments, switch 110 can search the default CAM 118 to determine the victim server to process the non-first fragments. Switch 110 can use at least one of a source IP address and a fragment identifier (e.g., the 16-bit IP identification field) contained in the second fragment to allocate the second fragment to the second server 140.

A fragment rewritten by second server 140 can contain the same source IP address and fragment identifier as that contained in the second fragment. Third server 150 receives the fragment rewritten by second server 140 that has been forwarded by switch 110 to third server 150.

A third exemplary application of connection splicing to the third embodiment will now be described. In this embodiment, a first fragment containing the computer network address of the first server is again directed via the switch to the first server 130. A second fragment is directed to the second server 140. The first server 130, which again acts as the initiator, knows the group membership function, and notifies the second server of the fragment mapping <C1, IP1, identifier> $\Rightarrow$ <IP2, U>. The second server 140 rewrites the second fragment IP address (and other non-first fragments), and forwards the fragment(s) to the third server 150.

Exemplary embodiments of the present invention use the TCP protocol for the L4 packet layer. However, those skilled in the art will recognize that other transport layer and network protocols, such as, for example, the UDP protocol, can be used in accordance with exemplary embodiments for the L4 packet layer.

Figure 3A:
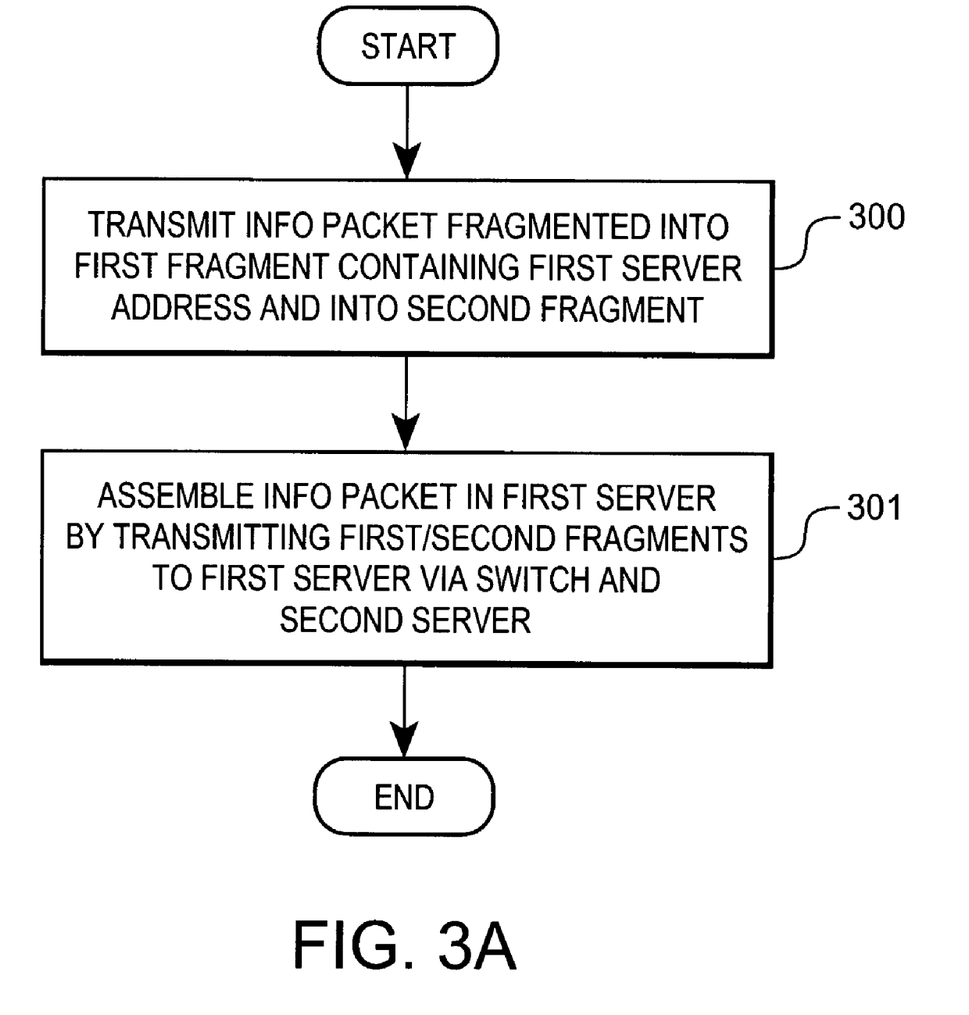
FIG. 3A is a flowchart for managing fragment information packets in a computer network according to a first embodiment.

FIG. 3A is a flowchart illustrating a method for managing fragment information packets in the FIG. 1 computer network according to the first exemplary embodiment wherein connection splicing is not used. The steps of FIG. 3A, like all flow charts described herein, can be performed in any order. In step 300, a method for managing fragmented information packets in a computer network, includes transmitting, from a client to a plurality of servers via a switch, an information packet, wherein the information packet is fragmented within the computer network into at least a first fragment containing a computer network address of a first of the plurality of servers, and into a separately transmitted second fragment. In step 301, the information packet is assembled in the first server by transmitting the second fragment from a second server to the first server. The assembling includes transmitting the first fragment and the second fragment via the switch to the second server, and forwarding the first fragment and the second fragment from the second server to the first server. To achieve this, the switch identifies the first server by using the first server's alias address as the source address when transmitting the first fragment.

Figure 3B:
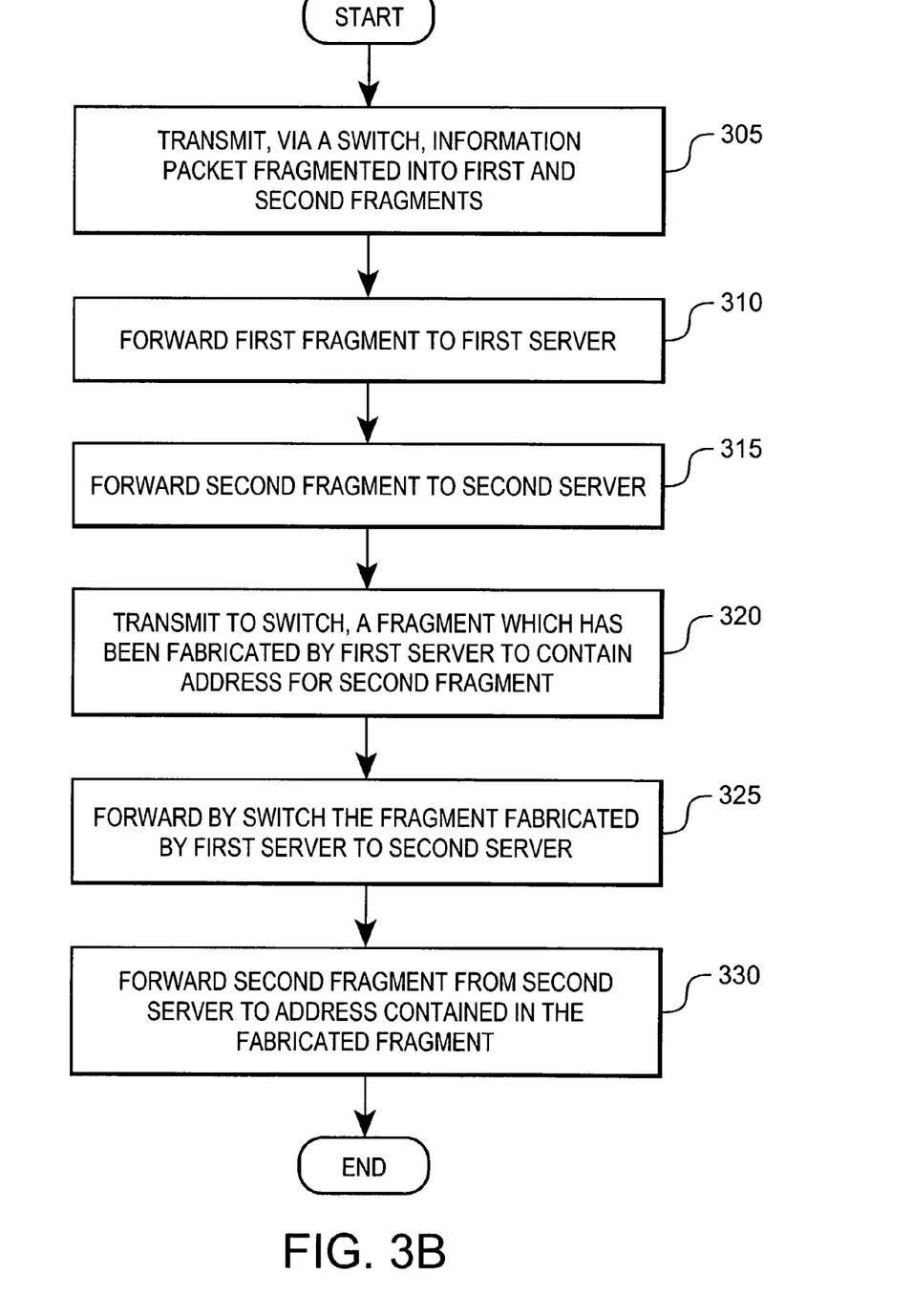
FIG. 3B is an exemplary flowchart for managing fragmented information packets in a computer network in accordance with another exemplary embodiment of the present invention.

FIG. 3B is a flowchart illustrating a method for managing fragmented information packets in a computer network in accordance with the second exemplary embodiment of the present invention, wherein connection splicing is not used. In step 305, an information packet is transmitted from a client to a plurality of servers via a switch. The information packet is fragmented within the computer network into at least a first fragment and a second fragment.

In step 310, the switch forwards the first fragment to a first server of the plurality of servers using a computer network address contained in the first fragment. Since the first fragment contains a full L4 header, the switch can search its connection table to determine which server is handling the connection. For purposes of illustration, the first server can be sent the first fragment by the switch.

In step 315, the switch forwards the second fragment to a second server of the plurality of servers using connection information contained in the switch. The source IP address and the fragment identifier are contained in the second fragment. Because the second fragment does not contain a full L4 header, the switch can not use its connection table. However, the switch can search its default CAM to determine the victim server to which to send the second and other non-first fragments for the connection. For purposes of illustration and not limitation, the switch can determine that the second server is to be the victim server, although any server can act as the victim server, depending on the entries maintained in the switch's default CAM. According to exemplary embodiments, the switch can use at least one of a source IP address and a fragment identifier (e.g., the 16-bit IP identification field) in the second fragment to allocate the second fragment to the second server.

The identity of the terminating server to which the victim server is to forward the non-first fragments can be communicated to the victim server using a dummy fragment fabricated by the terminating server. Thus, in step 320, the first server transmits to the switch a fragment fabricated by the first server that contains a computer network address to which the second fragment (and any other non-first fragments) is to be sent by the second server. According to the second exemplary embodiment, the computer network address to which the second fragment is to be sent by the second server is a computer network address (e.g., the Ethernet (MAC) destination address) of the first server.

The fragment fabricated by the first server can contain the same source IP address and fragment identifier contained in the second fragment. Thus, the first server can fabricate or otherwise construct a non-first fragment that contains the address to which the second server is to forward the second and other non-first fragments. To send the fabricated fragment to the switch, the first server can put the Ethernet (MAC) address of the switch in the Ethernet (MAC) destination address field of the fabricated fragment.

In step 325, the switch can place the alias of the first server in the source address before forwarding the fragment to identify the fragment as a dummy fragment. The switch then forwards the fragment fabricated by the first server to the second server. In step 330, the second server forwards the second fragment (and any other non-first fragments) to the computer network address contained in the fragment fabricated by the first server.

Once the second server receives the fragment fabricated by the first server, the second server can recognize it as a dummy fragment, and can use the Ethernet (MAC) source address of the fabricated fragment to create an entry in the victim table of the second server (i.e., the victim server). The entry in the victim table of the second server informs the second server that non-first fragments with the particular source IP address and fragment identifier of the fabricated fragment are to be forwarded to the alias address of the server contained in the fabricated fragment. The second server can, of course, receive any number of fragments prior to the first fragment passing through the switch, and can queue the fragments until an entry is created in its victim table to identify where the fragment should be sent. Once an entry is created in the victim table, the second server can forward the second fragment (and all non-first fragments) to the computer network address contained in the fragment fabricated by the first server using the corresponding entry in the victim table of the second server.

Figure 4:
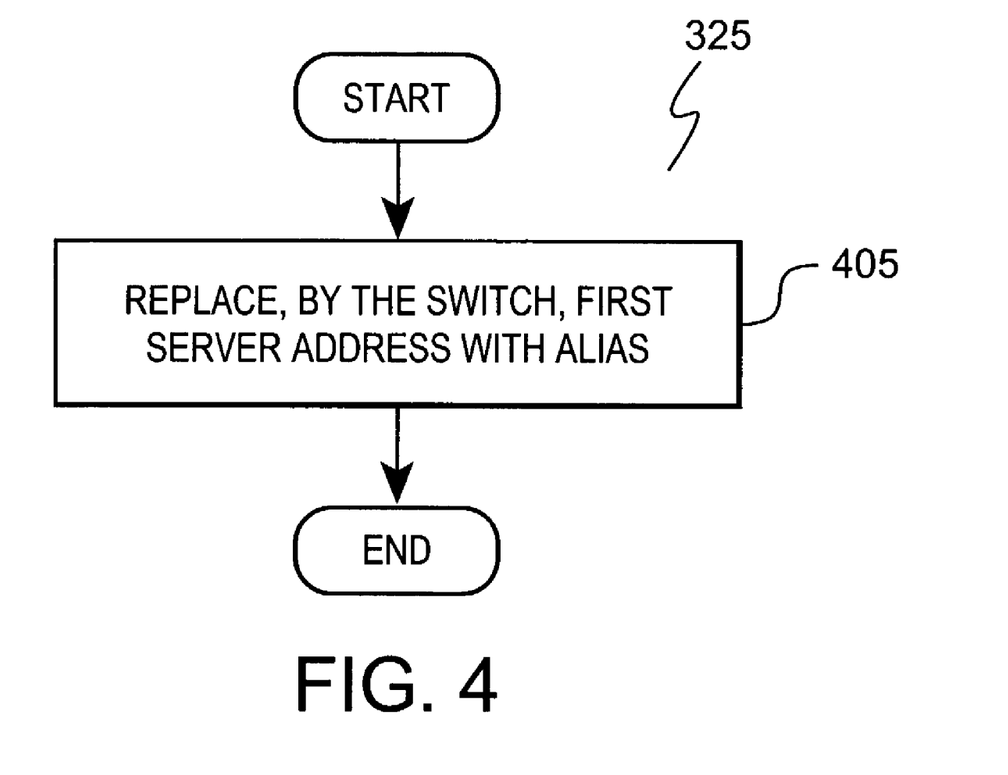
FIG. 4 is an exemplary flowchart illustrating the step of forwarding, by a switch, a fragment fabricated by a first server to a second server in accordance with an exemplary embodiment of the present invention.

FIG. 4 is a flowchart illustrating the forwarding, by a switch, of a dummy fragment fabricated by a first server to a second server. Before the fragment fabricated by the first server is forwarded to the second server by the switch, in step. 405 of FIG. 4, the switch can replace the computer network address (i.e., Ethernet (MAC) address) of the first server contained in the fabricated fragment with an alias of a computer network address of the first server. Thus, the switch can replace the Ethernet (MAC) source address of the fabricated fragment with an alias of the computer network address of the first server, rather than the actual Ethernet (MAC) source address of the first server. The second server upon recognizing the use of an alias address can map the alias address of the first server to the first server and update its victim table appropriately.

Since the first server does not know the identity of the victim server that is handling the non-first fragments, the first server can forward a fabricated fragment with the format of a non-first fragment through the switch. Since the switch does know the victim server that is handling the non-first fragments for the first server (by searching the switch's default CAM), the switch can correctly forward the fabricated packet to the correct victim server.

Figure 5:
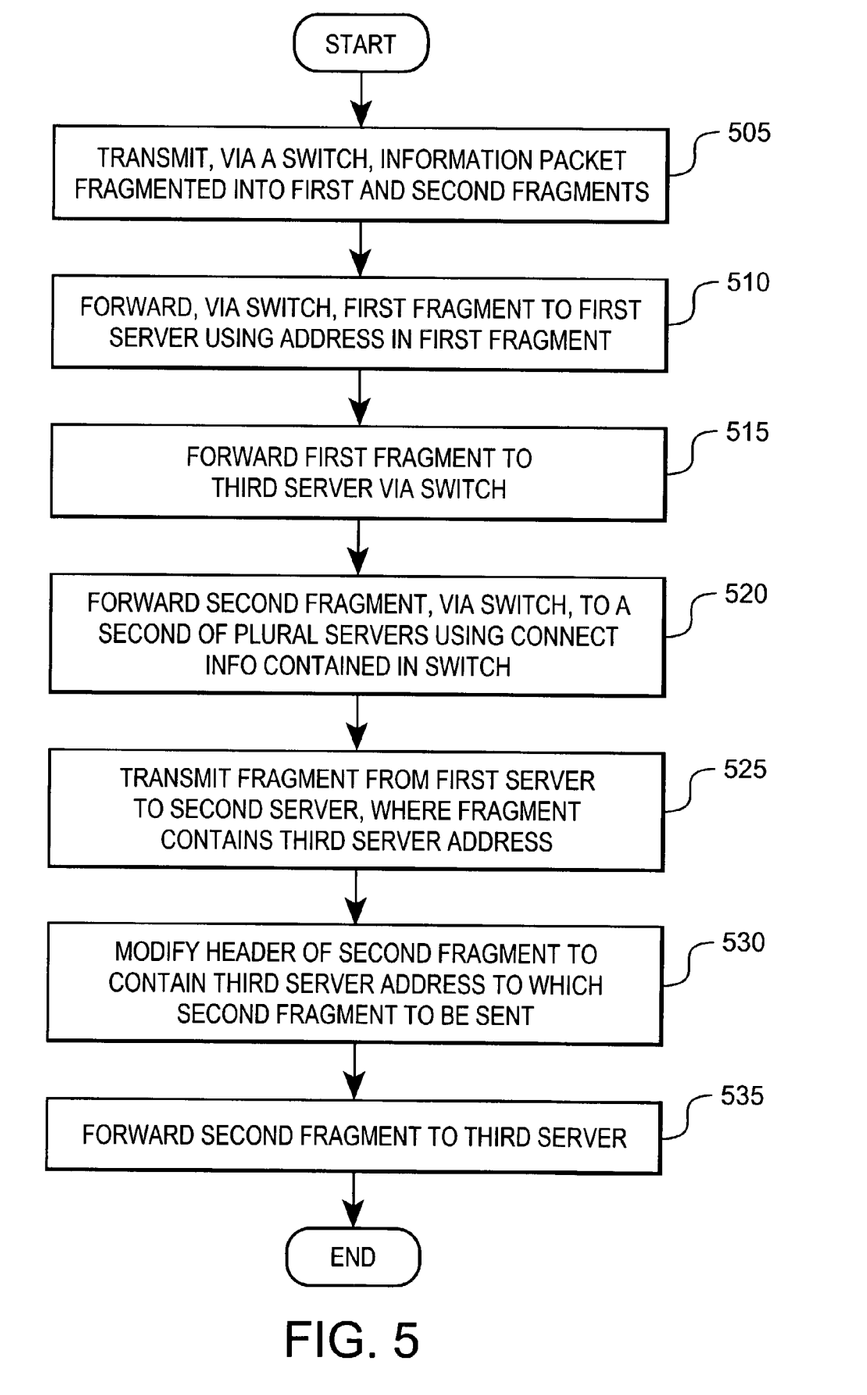
FIG. 5 is an exemplary flowchart illustrating the steps for managing fragmented information packets in a computer network with connection splicing in accordance with an alternate exemplary embodiment of the present invention.

The flow charts of FIGS. 3-5 can be modified to accommodate the third embodiment and its use of a predetermined group membership function to distribute the fabricated fragment. The predetermined group membership function can be any function that can be used by the switch and the plurality of servers to determine the members that are active and participating in the network.

According to the third exemplary embodiment, the predetermined group membership function is stateless and uses at least one of a source IP address, a destination IP address, and a fragment identifier to determine the distribution of the second fragment and other non-first fragments. Since the predetermined group membership function is known to all servers, the first server can use the predetermined group membership function to determine to which of the plurality of servers to transmit the fragment fabricated by the first server. Consequently, the first server can forward the fabricated fragment directly to the second server. Upon receipt of the fabricated fragment, the second server can forward the second and non-first fragments to the first server.

Alternately, because the indication to the second server that the non-first fragments should be sent to the first server need not pass through the switch, the fabricated fragment can be replaced with any control message that contains the computer network address of the first server along with the IP address and fragment identifier used to associate the fragments queued in the second server with the information packet intended for the first server.

For connection splicing according to exemplary embodiments, the computer network address to which the second fragment is to be sent by the second server is a computer network address of a third server. For connection splicing, the source and destination IP addresses and the TCP port numbers of the fragmented packets can be rewritten. To perform this, the first fragment is used to determine the above transformation (as it contains the full L4 header), and then the transformation can be applied to each non-first fragment that matches <C, IP1, identifier>.

FIG. 5 is a flowchart illustrating a method for modifying the second embodiment to accommodate connection splicing. In step 505, an information packet is transmitted from a client to a plurality of servers via a switch. The information packet is fragmented within the computer network into at least a first fragment and a second fragment. In step 510, the first fragment is forwarded by the switch to the first server using a computer network address contained in the first fragment. The switch can use the computer network address contained in the first fragment to locate in its connection table the identity of the server handling the connection. In step 515, the first server, acting as the initiator, forwards the first fragment to the third server through the switch.

In step 520, the switch forwards the second fragment to a second server of the plurality of servers using connection information contained in the switch. For example, the switch can use its default CAM to determine the victim server (e.g., the second server) that is handling the second and other non-first fragments. Thus, the switch can use at least one of a source IP address and a fragment identifier to allocate the second fragment to the second server. The source IP address and the fragment identifier are contained in the second fragment.

In step 525, a fragment fabricated by the first server is transmitted from the first server to the second server via the switch. The fragment fabricated by the first server contains a computer network address of a third server of the plurality of servers to which the second fragment is to be sent by the second server. According to exemplary embodiments, the fragment fabricated by the first server contains the same source IP address and fragment identifier contained in the second fragment.

In step 530, the second server modifies (e.g., rewrites) a header of the second fragment to contain the computer network address of the third server to which the second fragment is to be sent by the second server. For connection splicing, the source and destination IP addresses and the TCP port numbers of the fragmented packets can be rewritten by the second server. In step 535, the second fragment is forwarded from the second server to the computer network address of the third server contained in the fragment fabricated by the first server.

The steps of a computer program as illustrated in FIGS. 3-5 for managing communication of information fragments in a computer network can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for managing fragmented information packets in a computer network, comprising:
   transmitting an information packet from a client to a plurality of servers via a switch, the plurality of servers being configured to provide information or services to the client in response to requests for the information or services from the client, wherein the information packet is fragmented within the computer network into at least a first fragment containing a computer network address of a first of the plurality of servers, and into a separately transmitted second fragment; and assembling the information packet in the first server having the computer network address contained in the first fragment by transmitting the second fragment from a second server to the first server based at least in part on a forwarding address for the second fragment provided to the switch by the first server.

2. The method of claim 1, wherein the assembling includes:
transmitting the first fragment and the second fragment via the switch to the second server; and
forwarding the first fragment and the second fragment from the second server to the first server.

3. The method of claim 2, wherein the switch identifies the first server when transmitting the first fragment to the second server.

4. The method of claim 1, wherein the switch uses at least one of a source Internet protocol (IP) address and a fragment identifier to allocate a fragment to the second server, wherein the source IP address and the fragment identifier are contained in the first fragment and the second fragment.

5. The method of claim 1, wherein the computer network address to which the second fragment is to be sent by the second server is a computer network address of the first server.

6. The method of claim 1, wherein the information packet is one of a transmission control protocol (TCP) protocol data unit (PDU), and a user datagram protocol (UDP) protocol data unit (PDU).

7. The method of claim 1, wherein assembling includes:
forwarding, by the switch, the first fragment to the first server using a computer network address contained in the first fragment of the plurality of servers;
forwarding, by the switch, the second fragment to the second server of the plurality of servers using connection information contained in the switch;
transmitting, from the first server to the switch, a fragment fabricated by the first server, wherein the fragment fabricated by the first server contains a computer network address to which the second fragment is to be sent;
forwarding, by the switch, the fragment fabricated by the first server to the second server; and
forwarding the second fragment from the second server to the computer network address contained in the fragment fabricated by the first server.

8. The method of claim 7, wherein the forwarding of the fragment fabricated by the first server from the switch to the second server comprises:
replacing, by the switch, the computer network address of the first server contained in the fragment fabricated by the first server with an alias of a computer network address of the first server.

9. The method of claim 7, wherein the fragment fabricated by the first server contains the same source Internet protocol (IP) address and fragment identifier contained in the second fragment.

10. The method of claim 7, wherein the fragment fabricated by the first server contains, in a body of the fragment, the computer network address to which the second fragment is to be sent.

11. The method of claim 1, wherein the first fragment contains a layer four TCP header, and wherein the layer four TCP header is absent from the second fragment.

12. The method of claim 1, wherein the step of forwarding the second fragment from the second server comprises:
modifying, by the second server, a header of the second fragment to contain the computer network address to which the second fragment is to be sent by the second server.

13. The method of claim 1, wherein the assembling includes:
using a predetermined group membership function of the switch to distribute the second fragment, wherein the predetermined group membership function is known to each of the plurality of servers.

14. The method of claim 13, wherein the predetermined group membership function is stateless and uses at least one of a source Internet protocol (IP) address, a destination IP address, and a fragment identifier in determining the distribution of the second fragment.

15. The method of claim 13, wherein the first server uses the predetermined group membership function to determine to which of the plurality of servers to transmit the fragment fabricated by the first server.

16. A method for managing fragmented information packets in a computer network using connection splicing, comprising:
transmitting an information packet from a client to a plurality of servers via a switch, the plurality of servers being configured to provide information or services to the client in response to requests for the information or services from the client, wherein the information packet is fragmented within the computer network into at least a first fragment containing a computer network address of a first of the plurality of servers, and into a separately transmitted second fragment; and
assembling the information packet in a third server by transmitting the second fragment from a second server to the third server based at least in part on a forwarding address for the second fragment provided to the switch by the first server.

17. The method of claim 16, wherein assembling includes:
forwarding, by the switch, the second fragment to a second server of the plurality of servers using connection information contained in the switch;
transmitting, from the first server to the second server via the switch, a fragment fabricated by the first server, wherein the fragment fabricated by the first server contains a computer network address of the third server to which the second fragment is to be sent;
modifying, by the second server, a header of the second fragment to contain the computer network address of the third server to which the second fragment is to be sent by the second server; and
forwarding the second fragment from the second server to the computer network address of the third server contained in the fragment fabricated by the first server.

18. The method of claim 17, comprising:
forwarding, by the switch, the first fragment to the first server using a computer network address contained in the first fragment; and
forwarding, by the first server, the first fragment to the third server through the switch.

19. The method of claim 17, wherein the switch uses at least one of a source Internet protocol (IP) address and a fragment identifier to allocate the second fragment to the second server, wherein the source IP address and the fragment identifier are contained in the second fragment.

20. The method of claim 17, wherein the fragment fabricated by the first server contains the same source Internet protocol (IP) address and fragment identifier contained in the second fragment.

21. A system for managing fragmented information packets in a computer network, comprising:
a switch configured to receive and forward an information packet that has been fragmented within the computer network into at least a first fragment containing a computer network address of a first server of a plurality of servers configured to provide information or services to one or more clients in response to requests for the information or services from the one or more clients, and into a separately transmitted second fragment; and a second server of the plurality of servers configured to receive the second fragment that has been forwarded from the switch using connection information contained in the switch, and for transmitting the second fragment to the first server having the computer network address contained in the first fragment based at least in part on a forwarding address for the second fragment provided to the switch by the first server.

22. The system of claim 21, wherein the computer network address to which the second fragment is to be sent by the second server is a computer network address of the first server.

23. The system of claim 21, wherein the switch is configured to use at least one of a source Internet protocol (IP) address and a fragment identifier to allocate the second fragment to the second server, wherein the source IP address and the fragment identifier are contained in the second fragment.

24. The system of claim 21, wherein the first server is provided for receiving the first fragment that has been forwarded from the switch using a computer network address contained in the first fragment, and for transmitting to the switch a fragment fabricated by the first server, wherein the fragment fabricated by the first server contains a computer network address to which the second fragment is to be sent; and wherein the second server is provided for receiving the fragment fabricated by the first server that has been forwarded by the switch to the second server, and wherein the second server forwards the second fragment to the computer network address contained in the fragment fabricated by the first server.

25. The system of claim 24, wherein the switch is configured to replace the computer network address of the first server contained in the fragment fabricated by the first server with an alias of a computer network address of the first server, when the fragment fabricated by the first server is forwarded from the switch to the second server.

26. The system of claim 24, wherein the fragment fabricated by the first server contains the same source Internet protocol (IP) address and fragment identifier contained in the second fragment.

27. The system of claim 24, wherein the fragment fabricated by the first server contains, in a body of the fragment, the computer network address to which the second fragment is to be sent.

28. The system of claim 21, wherein the information packet is at least one of a transmission control protocol (TCP) protocol data unit (PDU) and a user datagram protocol (UDP) protocol data unit (PDU).

29. The system of claim 21, wherein the first fragment contains a layer four TCP header, and wherein the layer four TCP header is absent from the second fragment.

30. The system of claim 21, wherein the second server is configured to modify a header of the second fragment to contain the computer network address to which the second fragment is to be sent by the second server, when the second fragment is forwarded from the second server.

31. The system of claim 21, wherein a predetermined group membership function is used by the switch to distribute the second fragment, and wherein the predetermined group membership function is known to each of the plurality of servers.

32. The system of claim 31, wherein the predetermined group membership function is stateless and uses at least one of a source Internet protocol (IP) address, a destination IP address, and a fragment identifier in determining the distribution of the second fragment.

33. The system of claim 31, wherein the first server is configured to use the predetermined group membership function to determine to which of the plurality of servers to transmit the fragment fabricated by the first server.

34. A system for managing fragmented information packets in a computer network using connection splicing, comprising:

a switch configured to receive and forward an information packet that has been fragmented within the computer network into at least a first fragment containing a computer network address of a first server of a plurality of servers configured to provide information or services to one or more clients in response to requests for the information or services from the one or more clients, and into a separately transmitted second fragment; and a second server of the plurality of servers configured to receive the second fragment that has been forwarded from the switch using connection information contained in the switch, and for transmitting the second fragment to the third server based at least in part on a forwarding address for the second fragment provided to the switch by the first server.

35. The system of claim 34, wherein the first server is provided for transmitting to the switch a fragment fabricated by the first server, wherein the fragment fabricated by the first server contains a computer network address of a third server of a plurality of servers to which the second fragment is to be sent.

36. The system of claim 35, wherein the switch is configured to forward the first fragment to the first server using a computer network address contained in the first fragment, and wherein the first server forwards the first fragment to the third server through the switch.

37. The system of claim 35, wherein the information packet is at least one of a transmission control protocol (TCP) protocol data unit (PDU) and a datagram protocol (UDP) PDU.

38. The system of claim 35, wherein the switch is configured to use at least one of a source Internet protocol (IP) address and a fragment identifier to allocate the second fragment to the second server, wherein the source IP address and the fragment identifier are contained in the second fragment.

39. The system of claim 35, wherein the fragment fabricated by the first server contains the same source Internet protocol (IP) address and fragment identifier contained in the second fragment.

* * * * *